United States Patent
Bhaumik et al.

(10) Patent No.: US 11,286,784 B2
(45) Date of Patent: Mar. 29, 2022

(54) AEROFOIL ASSEMBLY AND METHOD

(71) Applicant: ROLLS-ROYCE PLC, London (GB)

(72) Inventors: Soumyik Bhaumik, Bangalore (IN); Rohit Chouhan, Bangalore (IN)

(73) Assignee: ROLLS-ROYCE PLC, London (GB)

(*) Notice: Subject to any disclaimer, the term of this patent is extended or adjusted under 35 U.S.C. 154(b) by 0 days.

(21) Appl. No.: 17/149,128

(22) Filed: Jan. 14, 2021

(65) Prior Publication Data

US 2021/0254473 A1    Aug. 19, 2021

(30) Foreign Application Priority Data

Feb. 13, 2020   (IN) .............................. 202011006273
Apr. 3, 2020    (GB) .................................... 2004924

(51) Int. Cl.
    *F01D 5/14*   (2006.01)
(52) U.S. Cl.
    CPC .......... *F01D 5/147* (2013.01); *F05D 2220/32* (2013.01); *F05D 2230/10* (2013.01)
(58) Field of Classification Search
    CPC .......... F01D 5/143; F01D 5/145; F01D 5/141; F01D 5/14; F01D 5/022; F01D 5/147; F01D 5/22; F01D 5/26; Y10T 29/49336; Y10T 29/49316; Y10T 29/49321
    See application file for complete search history.

(56) References Cited

U.S. PATENT DOCUMENTS

2013/0224027 A1* 8/2013 Barr ...................... F01D 5/143
                                                      416/193 A

FOREIGN PATENT DOCUMENTS

| EP | 2487329 A1 | 8/2012 | |
| EP | 2586975 A2 | 5/2013 | |
| EP | 3064709 A1 * | 9/2016 | ............. F01D 11/001 |
| EP | 3064709 A1 | 9/2016 | |
| EP | 3375977 A1 * | 9/2018 | ............. F01D 5/143 |
| EP | 3375977 A1 | 9/2018 | |
| WO | 2018/128609 A1 | 7/2018 | |
| WO | 2019/030314 A1 | 2/2019 | |

OTHER PUBLICATIONS

English translation EP3375977 (Year: 2018).*
Aug. 24, 2020 Search Report issued in UK Patent Application No. GB2004924.3.
Aug. 24, 2020 Search Report issued in UK Patent Application No. GB2004925.0.
U.S. Appl. No. 17/149,142, filed Jan. 14, 2021 in the name of Rohit Chouhan et al.
Jul. 19, 2021 Search Report issued in European Patent Application No. 21151258.7.
Jul. 19, 2021 Search Report issued in European Patent Application No. 21151259.5.

* cited by examiner

*Primary Examiner* — Jason L Vaughan
*Assistant Examiner* — Amanda Kreiling
(74) *Attorney, Agent, or Firm* — Oliff PLC

(57) ABSTRACT

An aerofoil assembly includes a platform and one or more aerofoils extending radially outward from the platform. The platform has a first edge, a second edge, and a platform surface disposed between the first edge and the second edge. The one or more aerofoils are disposed between the first edge and the second edge. Each of the one or more aerofoils has a leading edge proximal to the first edge and a trailing edge distal to the first edge. The platform defines one or more recesses disposed between the leading edge of each of the one or more aerofoils and the first edge.

14 Claims, 8 Drawing Sheets

AEROFOIL ASSEMBLY AND METHOD

CROSS-REFERENCE TO RELATED APPLICATIONS

This specification is based upon and claims the benefit of priority from IN Patent Application Number 202011006273 filed on 13 Feb. 2020, and UK Patent Application Number 2004924.3 filed on 3 Apr. 2020, the entire contents of which are incorporated herein by reference.

BACKGROUND

Field of The Disclosure

The present disclosure is related to an aerofoil assembly and a method of reducing losses in the aerofoil assembly.

Description of the Related Art

Gas turbine engines typically employ rows of blades on wheels/disks of a rotor assembly, which alternate with rows of stationary vanes on a stator or nozzle assembly. Axial and/or radial openings at an interface between rotating blades and stationary vanes can allow hot combustion gases to exit a hot gas path and enter an intervening wheel space between the rows.

To limit such incursion of hot gases, cooling air or purge air is often introduced into a wheel space between the rows. This purge air serves to cool components and spaces within the wheel spaces as well as providing a counter flow of cooling air to further restrict incursion of hot gases into the wheel space.

Nevertheless, conventional gas turbine engines exhibit a significant amount of purge air escape into the hot gas path. The consequent mixing of cooler purge air with hot gas results in large mixing losses, due not only to the differences in temperature but also due to the differences in flow direction or swirl of purge air and hot gases. Losses may also result from the formation of strong pressure side horseshoe vortices. Such losses may decrease the efficiency of the gas turbine engine.

SUMMARY

In one aspect, an aerofoil assembly includes a platform and one or more aerofoils extending radially outward from the platform. The platform has a first edge, a second edge, and a platform surface disposed between the first edge and the second edge. The one or more aerofoils are disposed between the first edge and the second edge. Each of the one or more aerofoils has a leading edge proximal to the first edge and a trailing edge distal to the first edge. The platform defines one or more recesses disposed between the leading edge of each of the one or more aerofoils and the first edge.

The one or more recesses may provide an easier escape path for purge air to leak into a hot gas region with minimal interaction with the leading edges. Maintaining a gap or distance between a flow of purge air and the leading edges may mitigate the formation of pressure side horseshoe vortices. Therefore, the one or more recesses may reduce secondary losses in a passage adjacent to the one or more aerofoils. Consequently, the one or more recesses may improve an efficiency of the aerofoil assembly. Further, the one or more recesses may result in weight reduction of the aerofoil assembly.

In some embodiments, the one or more aerofoils may include a plurality of aerofoils.

A number of the aerofoils may depend upon application requirements.

In some embodiments, a pitch spacing may be defined between the leading edges of adjacent aerofoils along the platform surface. A mid-pitch location may be defined midway along the pitch spacing.

In some embodiments, each of the one or more recesses may be disposed proximal to the mid-pitch location between adjacent aerofoils.

The location of each recess proximal to the mid-pitch location may provide an optimal gap between the flow of purge air and the leading edges of adjacent aerofoils, thereby mitigating the formation of pressure side horseshoe vortices.

In some embodiments, a minimum distance between the mid-pitch location and each of the one or more recesses may be between about 0% to about 70% of a distance between the first edge and the leading edge of each aerofoil.

The location of each recess relative to the mid-pitch location may be chosen so as to minimise secondary losses.

In some embodiments, a minimum distance between the first edge and each of the one or more recesses may be between about 0% to about 70% of the distance between the first edge and the leading edge of each aerofoil.

The location of each recess relative to the first edge may be chosen so as to minimise secondary losses.

In some embodiments, a minimum distance between each of the one or more recesses and the leading edge of each of the adjacent aerofoils may be between about 10% to about 60% of the pitch spacing between the leading edges of the adjacent aerofoils.

The location of each recess relative to the pitch spacing may be chosen so as to minimise secondary losses.

In some embodiments, each of the one or more recesses may extend from the first edge of the platform to the mid-pitch location.

The extent of each recess from the first edge of the platform to the mid-pitch location may minimise secondary losses.

In some embodiments, a mid-pitch region at least partly defined between adjacent aerofoils may extend from the first edge to the second edge through the mid-pitch location. Each of the one or more recesses may be disposed on the mid-pitch region.

The location of each recess on the mid-pitch region may provide an optimal gap between the flow of purge air and the leading edges of adjacent aerofoils, thereby mitigating the formation of pressure side horseshoe vortices.

In some embodiments, the aerofoil assembly may further include a plurality of blade segments disposed adjacent to each other. Each blade segment may include a corresponding aerofoil from the plurality of aerofoils and a platform portion that forms part of the platform.

A number of the blade segments may be based on assembly requirements.

In some embodiments, each of the one or more recesses may include a plurality of recesses.

A number of the recesses may depend upon a number of the aerofoils such that one recess is disposed between two adjacent aerofoils.

In some embodiments, the platform portion of each blade segment may define a first section of a recess from the plurality of recesses and a second section of an adjacent recess. The first section of the platform portion of each blade segment and the second section of the platform portion of an adjacent blade segment may together form the recess.

In some embodiments, an area of the first section may be greater than an area of the second section.

In some embodiments, the platform portion of each blade segment may include a first longitudinal edge and a second longitudinal edge opposite to the first longitudinal edge. The first longitudinal edge of the platform portion of each blade segment may be aligned with the second longitudinal edge of the platform portion of the adjacent blade segment. The first section may be disposed at the first longitudinal edge, and the second section may be disposed at the second longitudinal edge.

The first section and the second section of the recess may be aligned to allow ease of assembly of the plurality of blade segments. The area of the first section and the area of the second section may further depend on assembly requirements.

In some embodiments, each of the one or more recesses may have a maximum depth of between about 0.1% to about 6% of a maximum height of each of the one or more aerofoils relative to the platform surface.

The maximum depth of each recess relative to the maximum height of the aerofoil may be chosen so as to minimise interaction between purge air and the leading edge of the aerofoil.

In some embodiments, each of the one or more recesses may include a first lobe and a second lobe adjoining the first lobe.

The first lobe and the second lobe of each recess may facilitate the flow of purge air.

In one aspect, a gas turbine engine may include the aerofoil assembly.

In another aspect, a method of reducing losses in an aerofoil assembly is provided. The method includes providing a platform having a first edge, a second edge, and a platform surface disposed between the first edge and the second edge. The method further includes providing one or more aerofoils extending radially outward from the platform and disposed between the first edge and the second edge. Each of the one or more aerofoils has a leading edge proximal to the first edge and a trailing edge distal to the first edge. The method further includes forming one or more recesses disposed between the leading edge of each of the one or more aerofoils and the first edge.

In some embodiments, each of the one or more recesses may be formed by removing material from the platform surface. In some other embodiments, each of the one or more recesses may be formed by casting. In other words, each of the one or more recesses may be a cast-in feature.

The method may improve the stage efficiency of a turbine by mitigating the formation of pressure side horseshoe vortices. The method may also result in weight reduction of the turbine.

Each recess may be formed by any suitable process that is chosen based on ease of manufacture while maintaining strength of the aerofoil assembly.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 $Nkg^{-1}$ s, 105 $Nkg^{-1}$ s, 100 $Nkg^{-1}$ s, 95 $Nkg^{-1}$ s, 90 $Nkg^{-1}$ s, 85 $Nkg^{-1}$ s or 80 $Nkg^{-1}$ s. The specific thrust may be in an inclusive range bounded by any two of the values in the previous sentence (i.e. the values may form upper or lower bounds), for example in the range of from 80 $Nkg^{-1}$ s to 100 $Nkg^{-1}$ s, or 85 $Nkg^{-1}$ s to 95 $Nkg^{-1}$ s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION OF THE DISCLOSURE

Aspects and embodiments of the present disclosure will now be discussed with reference to the accompanying figures. Further aspects and embodiments will be apparent to those skilled in the art.

Figure 1:
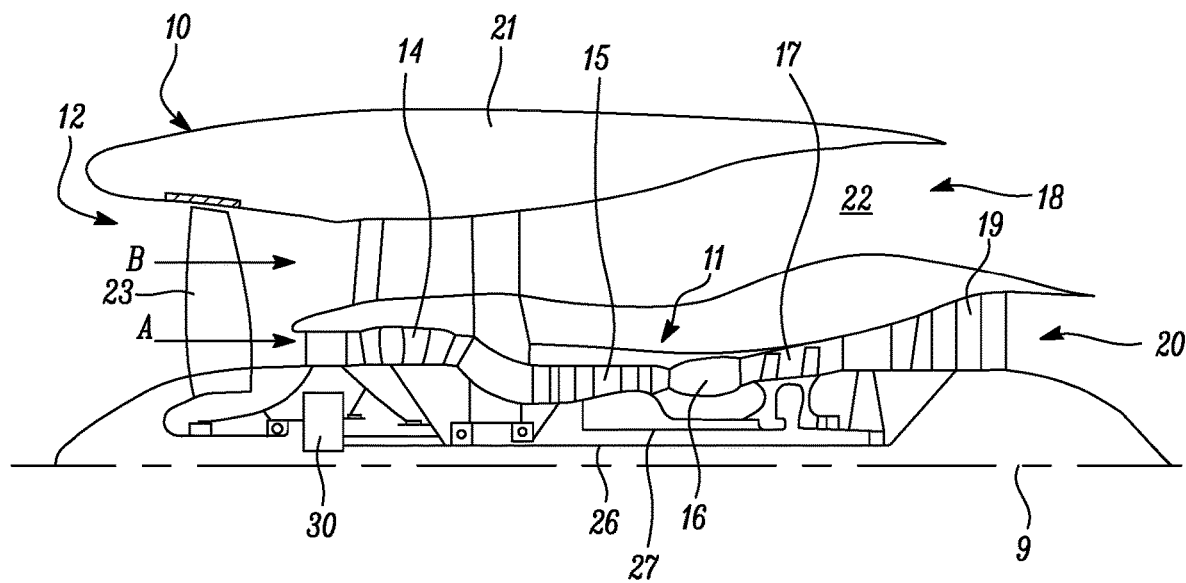
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
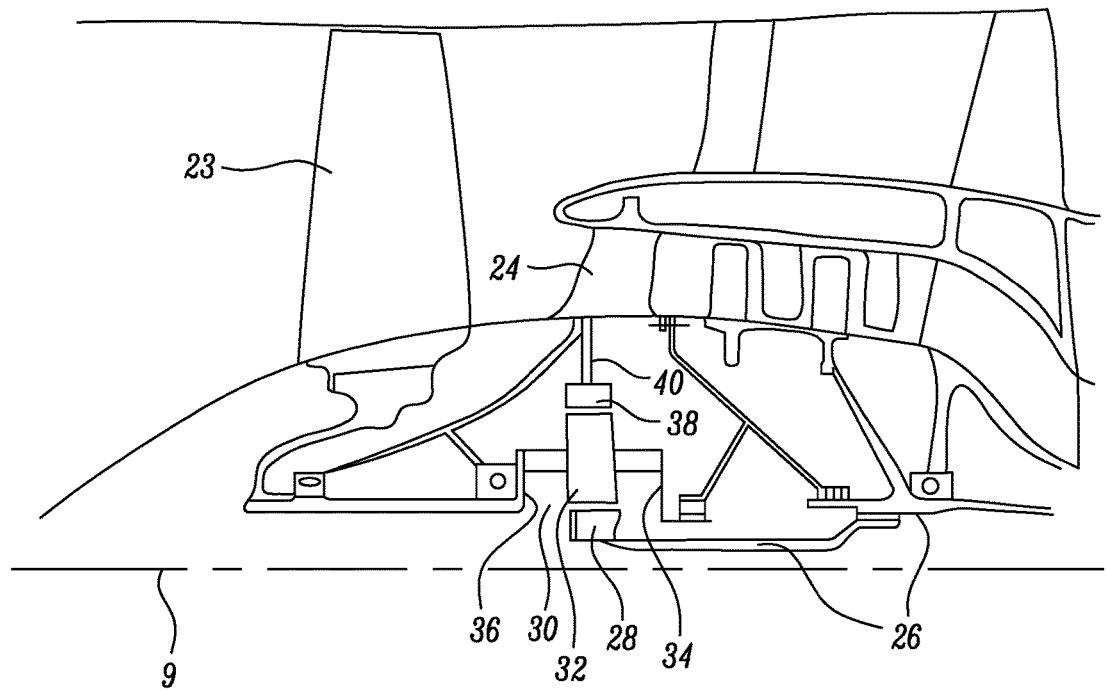
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to process around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
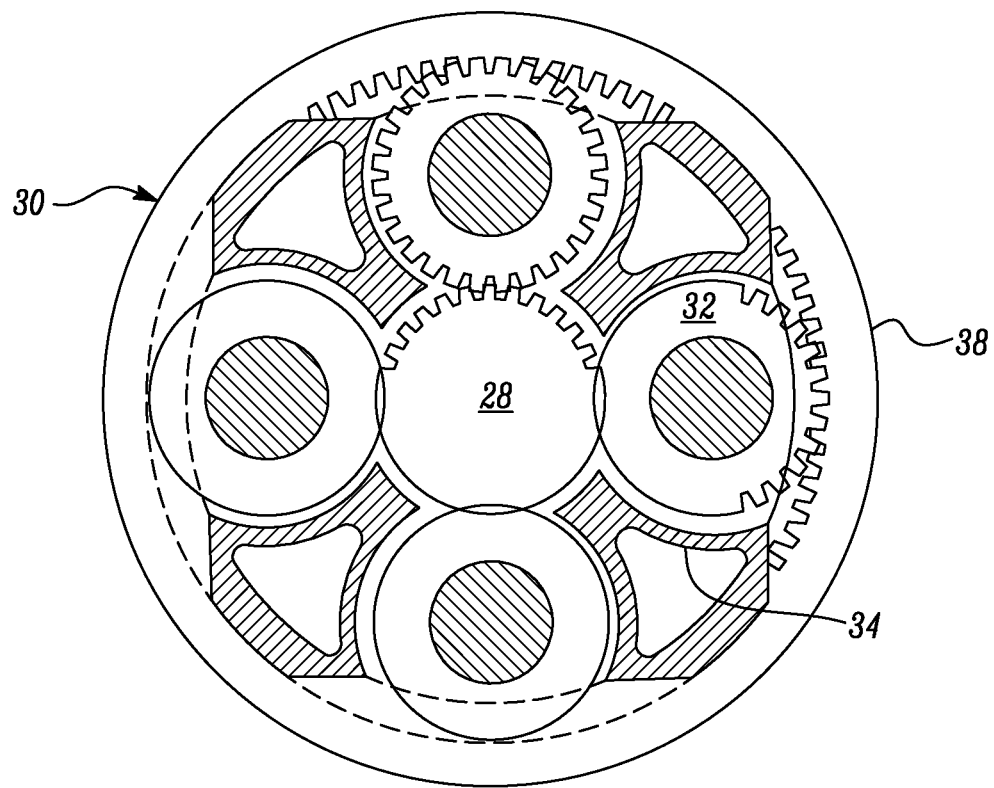
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

Figure 4:
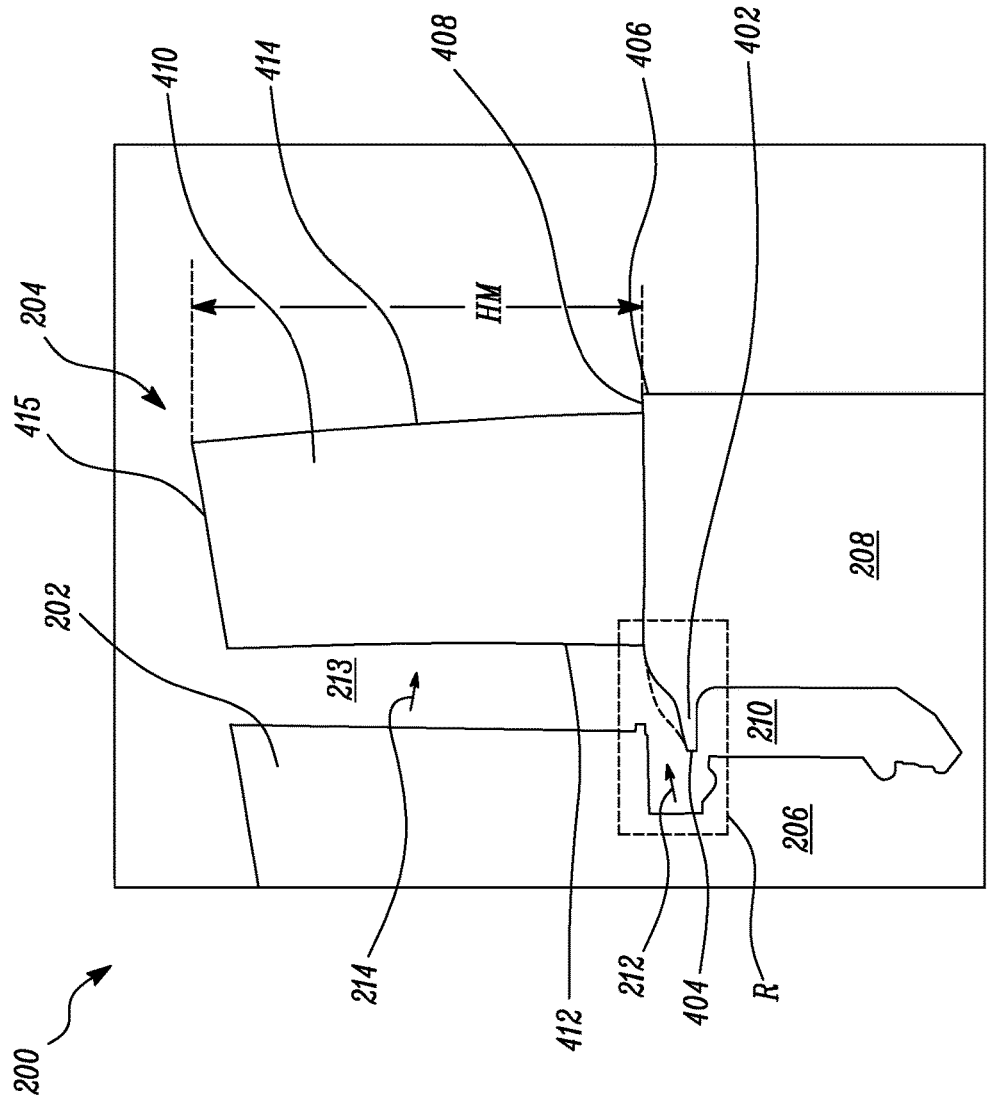
FIG. 4 is a schematic side view of an aerofoil blade assembly of the gas turbine engine.
Figure 4A:
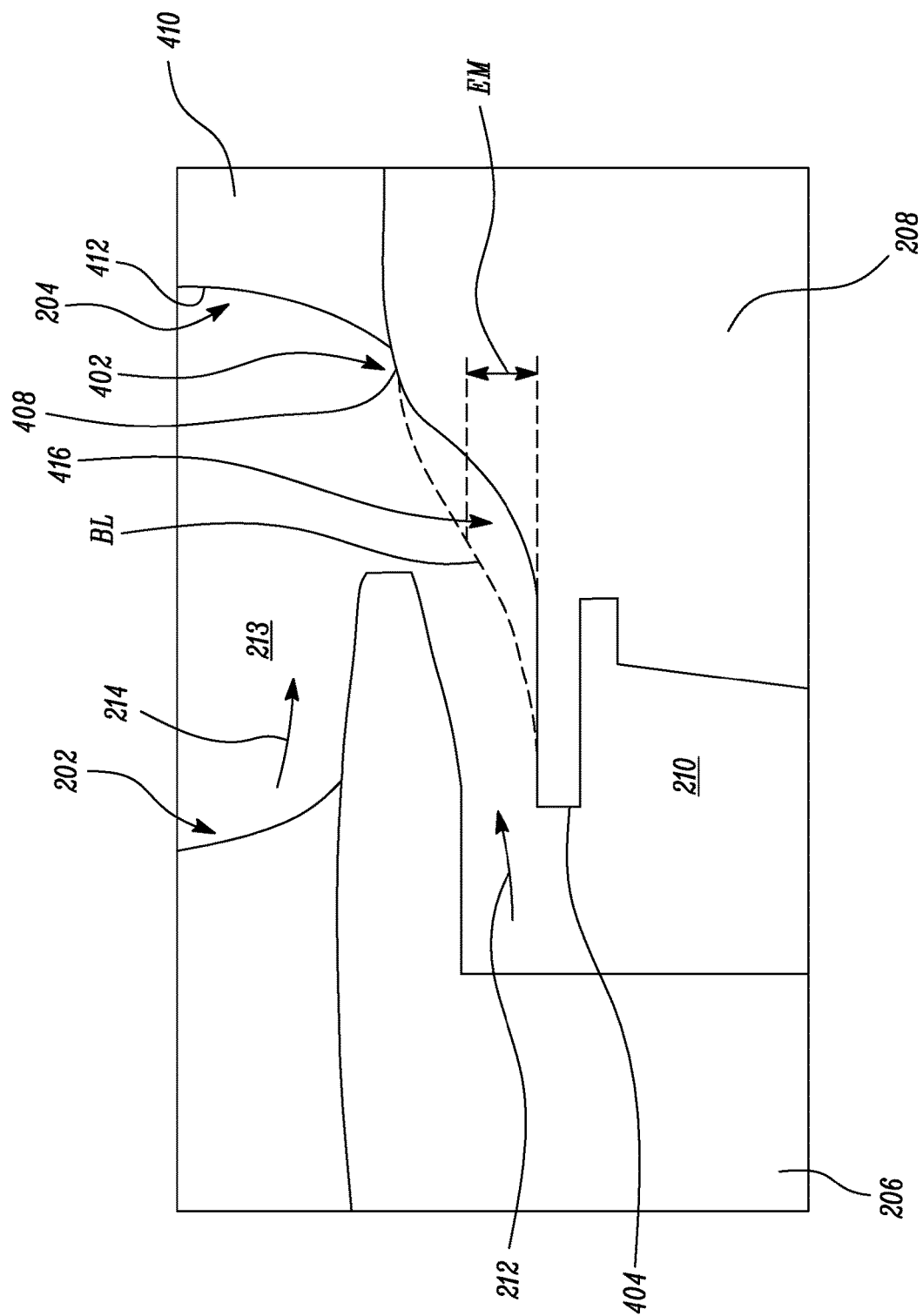
FIG. 4A is a detailed view of a region R of FIG. 4.

FIG. 4 illustrates an aerofoil assembly 200 according to an embodiment of the present disclosure. The gas turbine engine 10 (shown in FIG. 1) includes the aerofoil assembly 200. The aerofoil assembly 200 may be part of at least one of the high pressure turbine 17 and the low pressure turbine 19. FIG. 4A is a detailed view of a region R of FIG. 4.

Referring to FIGS. 1, 4 and 4A, the aerofoil assembly 200 includes a row of stator vanes 202 (only one shown in FIG. 4) and a row of blades 204 (only one shown in FIG. 4) located downstream of the row of stator vanes 202. The blades 204 may be mounted on a rotor disc (not shown). The stator vanes 202 and the blades 204 may form a single stage of the aerofoil assembly 200. In some embodiments, the aerofoil assembly 200 may include multiple stages.

The stator vanes 202 extend from a static wall 206. The blades 204 extend from a rotating wall 208. A wheel space 210 is defined between the static wall 206 and the rotating wall 208. In operation, cooling air or purge air 212 is introduced into the wheel space 210. Purge air 212 may cool components and spaces within the wheel space 210. Purge air 212 may be tapped from a compressor, for example, the low pressure compressor 14 and/or the high pressure compressor 15.

Further, a hot gas region 213 is defined between the stator vanes 202 and the blades 204. The hot gas region 213 receives hot gas 214. Purge air 212 may restrict incursion of hot gas 214 into the wheel space 210. Specifically, a flow of purge air 212 may be used to purge the wheel space 210 into the hot gas region 213 such that purge air 212 restricts hot gas 214 from flowing into the wheel space 210. Purge air 212 may therefore provide a rim seal flow in the aerofoil assembly 200.

An ejection of purge air 212 out of the wheel space 210 and interaction with hot gas 214 may result in a reduction of efficiency of the aerofoil assembly 200. The reduction of efficiency may be due to various types of losses, for example, mixing losses, penetration losses, secondary vortices, etc.

The aerofoil assembly 200 further includes a platform 402 having a first edge 404, a second edge 406, and a platform surface 408 disposed between the first edge 404 and the second edge 406. The first edge 404 faces the stator vanes 202. The platform surface 408 is the radially outward surface of the platform 402. Each blade 204 includes an aerofoil 410 extending radially outward from the platform 402 and disposed between the first edge 404 and the second edge 406. Specifically, the aerofoil assembly 200 includes one or more aerofoils 410 disposed between the first edge 404 and the second edge 406. Each of the one or more aerofoils 410 includes a leading edge 412 proximal to the first edge 404 of the platform 402 and a trailing edge 414 distal to the first edge 404. Each of the one or more aerofoils 410 defines a maximum height "HM" relative to the platform surface 408. The maximum height "HM" is the maximum radial height between the platform surface 408 and a tip 415 of the aerofoil 410. The maximum height "HM" may be defined between the platform surface 408 and the tip 415 of the aerofoil 410 adjacent to the trailing edge 414. In some embodiments, the one or more aerofoils 410 include a plurality of aerofoils 410. The aerofoil assembly 200 may include the plurality aerofoils 410 arranged in an array.

The platform 402 defines one or more recesses 416 (only one shown in FIG. 4A) disposed between the leading edges 412 of the plurality of aerofoils 410 and the first edge 404 of the platform 402. In some embodiments, each of the one or more recesses 416 is formed by removing material from the platform surface 408. In some other embodiments, each of the one or more recesses 416 is formed by casting. In other words, each of the one or more recesses 416 is a cast-in feature. Each of the one or more recesses 416 has a maximum depth "EM" of between about 0.1% to about 6% of the maximum height "HM" (shown in FIG. 4) of each of the one or more aerofoils 410 relative to the platform surface 408. A depth of the recess 416 may increase from a boundary 417 (shown in FIG. 5) of the recess 416 to the maximum depth "EM". Further, the depth of the recess 416 may be defined with respect to a baseline "BL" (shown by a dashed line) of the platform surface 408 without any recess. The baseline "BL" is a normal profile of the platform surface 408 without any recess or removal of material.

The recesses 416 may reduce losses due to purge air 212 and improve the efficiency of the aerofoil assembly 200, and hence the gas turbine engine 10.

Figure 5:
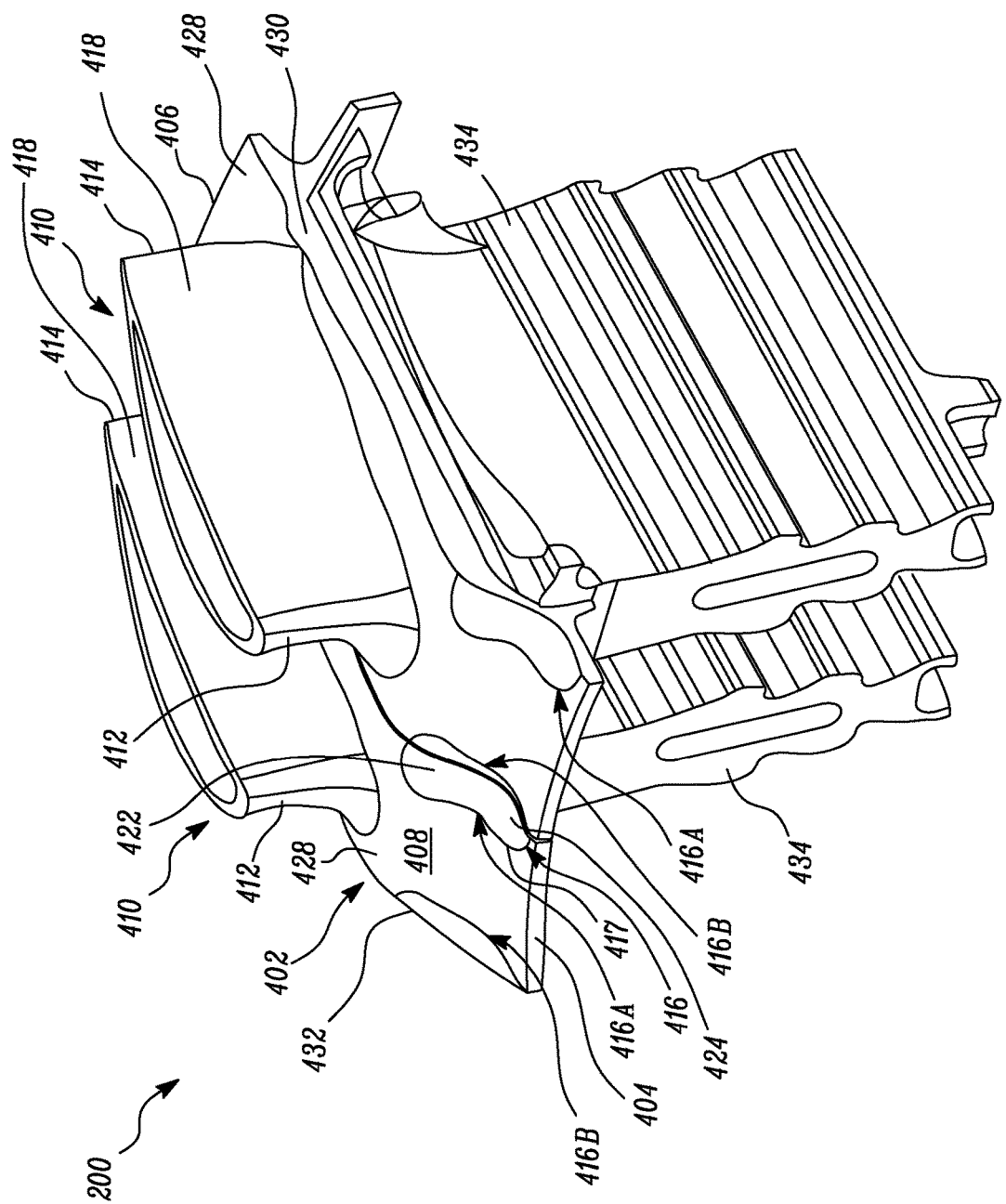
FIG. 5 is a partial schematic perspective view of an aerofoil assembly.
Figure 6:
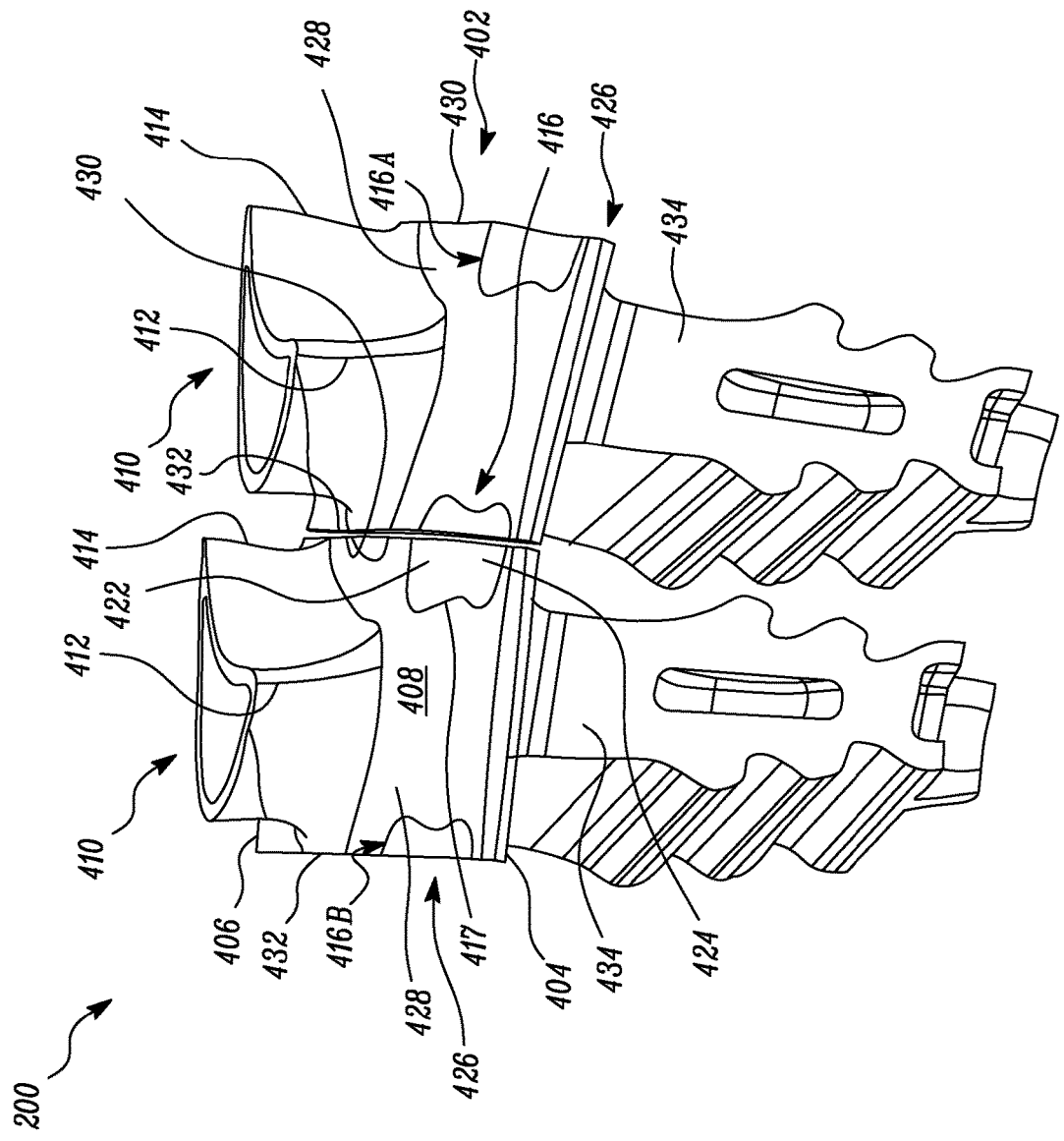
FIG. 6 is another partial schematic perspective view of the aerofoil assembly of FIG. 5.
Figure 7:
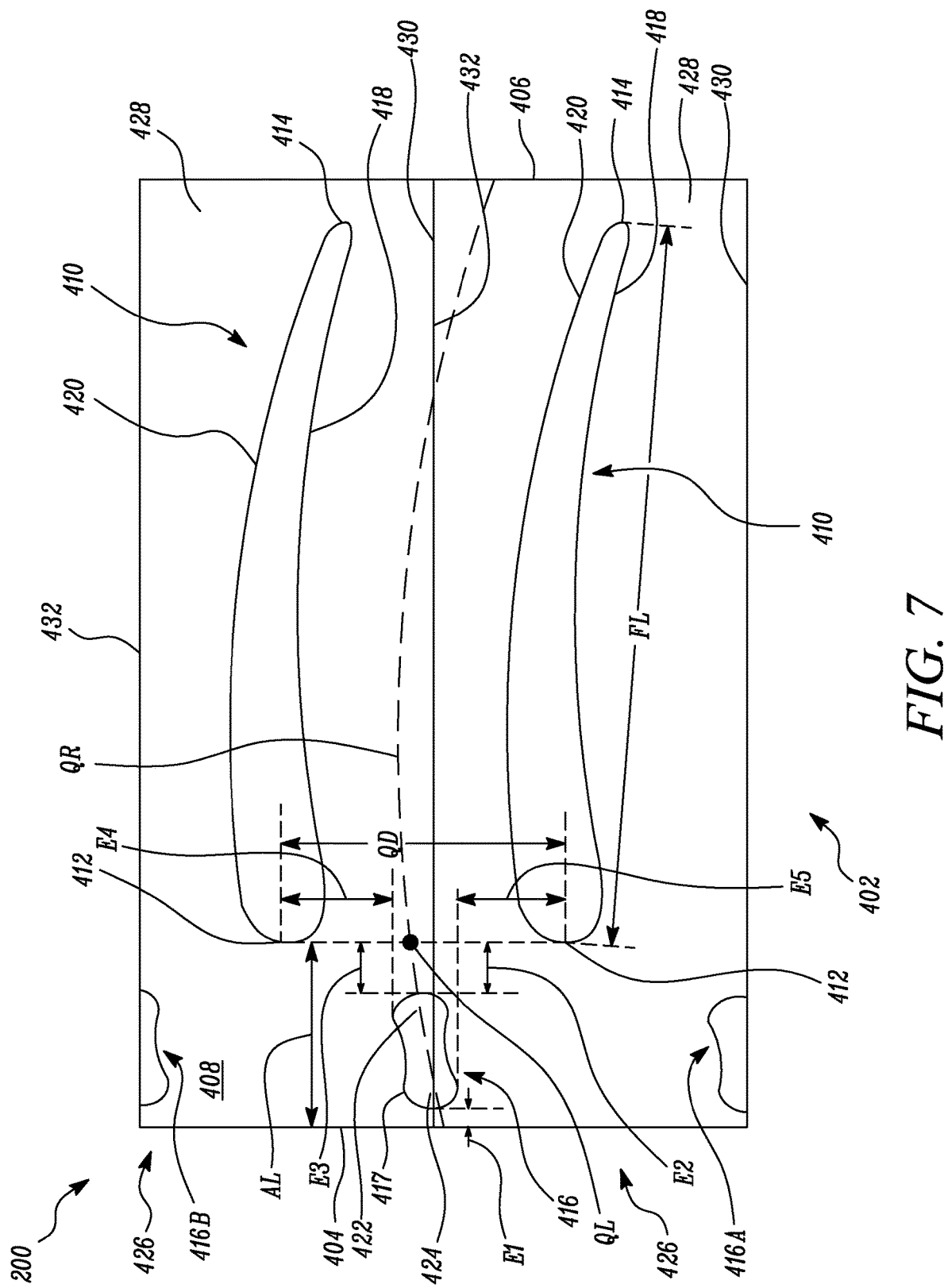
FIG. 7 is a partial schematic plan view of the aerofoil assembly of FIG. 5.

FIGS. 5, 6 and 7 illustrate different partial views of the aerofoil assembly 200 according to an embodiment of the present disclosure. The gas turbine engine 10 (shown in FIG. 1) includes the aerofoil assembly 200. In an embodiment, the aerofoil assembly 200 includes a turbine blade assembly of the gas turbine engine 10. The aerofoil assembly 200 may be part of at least one of the high pressure turbine 17 and the low pressure turbine 19.

The aerofoil assembly 200 includes the platform 402 having the first edge 404, the second edge 406, and the platform surface 408 disposed between the first edge 404 and the second edge 406. The platform surface 408 is the radially outward surface of the platform 402. The platform 402 further include the plurality of aerofoils 410 extending radially outward from the platform 402 and disposed between the first edge 404 and the second edge 406. Each aerofoil 410 includes the leading edge 412 proximal to the first edge 404 of the platform 402 and the trailing edge 414 distal to the first edge 404. The aerofoils 410 are partially shown in FIGS. 5 and 6. Each aerofoil 410 further defines a pressure surface 418 extending between the leading edge 412 and the trailing edge 414. Each aerofoil 410 further defines a suction surface 420 extending between the leading edge 412 and the trailing edge 414, and disposed opposite to the pressure surface 418. In the illustrated embodiment, the aerofoils 410 are disposed adjacent to each other.

The platform 402 defines the one or more recesses 416 disposed between the leading edges 412 of the plurality of aerofoils 410 and the first edge 404 of the platform 402. In some embodiments, the one or more recesses 416 includes a plurality of recesses 416. One recess 416 is fully shown in FIGS. 5-7, while other two recesses 416 are partly shown. In some embodiments, each recess 416 is formed by removing material from the platform surface 408. In some other embodiments, each recess 416 is formed by casting. One recess 416 may be provided for a pair of adjacent aerofoils 410.

A distance "AL" is defined between the first edge 404 and the leading edge 412 of each aerofoil 410. The distance "AL" is an axial distance between the first edge 404 of the platform 402 and an aerofoil leading edge plane. In some embodiments, a minimum distance "E1" between the first edge 404 and each of the one or more recesses 416 is between about 0% to about 70% of the distance "AL" between the first edge 404 and the leading edge 412 of each aerofoil 410. The minimum distance "E1" may be a minimum axial distance between the boundary 417 of the recess 416 and the first edge 404. I A depth of the recess 416 may increase from the boundary 417 to the maximum depth "EM" (shown in FIG. 4A) of the recess 416. A variation of the depth of the recess 416 from the boundary 417 may be uniform or non-uniform along a length of the boundary 417.

The aerofoil 410 further defines a chord length "FL" between the leading edge 412 and the trailing edge 414. The chord length "FL" is a length of a straight line connecting the leading and trailing edges 412, 414. In some embodiments, a minimum distance "E2" between the recess 416 and the leading edge 412 is 0 percent (%) to 5% of the chord length "FL". The minimum distance "E2" may be a minimum distance between the boundary 417 of the recess 416 and the leading edge 412.

The recesses 416 may reduce losses due to purge air 212 (shown in FIG. 4A) and improve the efficiency of the aerofoil assembly 200, and hence the gas turbine engine 10.

A pitch spacing "QD" is defined between the leading edges 412 of the adjacent aerofoils 410 along the platform surface 408. A mid-pitch location "QL" is defined midway along the pitch spacing "QD". The mid-pitch location "QL" may be a point defined midway (i.e., mid-point) on a straight line connecting the leading edges 412 of the adjacent aerofoils 410. A length of the straight line connecting the leading edges 412 is the pitch spacing "QD". Each of the one or more recesses 416 is disposed proximal to the mid-pitch location "QL" between the adjacent aerofoils 410. In some embodiments, a minimum distance "E3" between the mid-pitch location "QL" and each of the one or more recesses 416 is between about 0% to about 70% of the distance "AL" between the first edge 404 and the leading edge 412 of each aerofoil 410. The minimum distance "E3" is a minimum axial distance between the boundary 417 of the recess 416 and the mid-pitch location "QL".

In an embodiment, each of the one or more recesses 416 extends from the first edge 404 of the platform 402 to the mid-pitch location "QL". In such a case, the first edge 404 includes a portion of the recess 416. Further, each of the minimum distances "E1", "E2" and "E3" is zero.

In some embodiments, a minimum distance "E4", "E5" between each of the one or more recesses 416 and the leading edge 412 of each of the adjacent aerofoils 404 is between about 10% to about 60% of the pitch spacing "QD" between the leading edges 412 of the adjacent aerofoils 404. The minimum distance "E4" may be defined between the recess 416 and one of the adjacent aerofoils 404 on one side of the recess 416. The minimum distance "E5" may be defined between the recess 416 and the other of the adjacent aerofoils 404 on another side of the recess 416. In some embodiments, the minimum distance "E4" is equal to the minimum distance "E5". In some other embodiments, the minimum distance "E4" is different from the minimum distance "E5". The minimum distance "E4" may be a minimum circumferentially projected distance from the boundary 417 of the recess 416 to the leading 412 of one of the adjacent aerofoils 404. Similarly, the minimum distance "E5" may be a minimum circumferentially projected distance from the boundary 417 of the recess 416 to the leading edge 412 of the other adjacent aerofoil 404.

Further, a mid-pitch region "QR" is at least partly defined between the adjacent aerofoils 410. The mid-pitch region "QR" extends from the first edge 404 to the second edge 406 of the platform 402. Further, the mid-pitch region "QR" extends through the mid-pitch location "QL". The mid-pitch region "QR" may be a line that is a locus of mid-points between the adjacent aerofoils 410 on the platform surface 408. Specifically, the mid-pitch region "QR" may be the line that joins all mid-points between the pressure surface 418 of one aerofoil 410 and the suction surface 420 of the adjacent aerofoil 410 along the platform surface 408. The line may be straight, curved or a combination of both. Further, the mid-pitch region "QR" intersects the mid-pitch location "QL".

Each of the one or more recesses 416 includes a first lobe 422 and a second lobe 424 disposed adjoining the first lobe 422. The boundary 417 of the recess 416 may therefore define two curved regions that are joined by a pair of rounded regions. In some embodiments, an area of the first lobe 422 may be substantially equal to an area of the second lobe 424. In alternative embodiments, the area of the first lobe 422 may be different from the area of the second lobe 424. Each of the first lobe 422 and the second lobe 424 may have any suitable shape, for example, but not limited to, circular, elliptical, oval or any curved shape.

The aerofoil assembly 200 further includes a plurality of blade segments 426 disposed adjacent to each other. Each blade segment 426 includes a corresponding aerofoil 410 from the plurality of aerofoils 410 and a platform portion 428 that forms part of the platform 402. The platform portion 428 of each blade segment 426 defines a first section 416A of a recess 416 from the plurality of recesses 416 and a second section 416B of an adjacent recess 416. The first section 416A of the platform portion 428 of each blade segment 426 and the second section 416B of the platform portion 428 of an adjacent blade segment 426 together form the recess 416. In some embodiments, an area of the first section 416A is greater than an area of the second section 416B. In alternative embodiments, the area of the first section 416A may be less than or equal to the area of the second section 416B.

The platform portion 428 of each blade segment 426 includes a first longitudinal edge 430 and a second longitudinal edge 432 opposite to the first longitudinal edge 430. The first longitudinal edge 430 of the platform portion 428 of each blade segment 426 is aligned with the second longitudinal edge 432 of the platform portion 428 of the adjacent blade segment 426. The first section 416A is disposed at the first longitudinal edge 430 and the second section 416B is disposed at the second longitudinal edge 432.

In the illustrated embodiment of FIGS. 5, 6 and 7, two adjacent blade segments 426 are shown. However, multiple such the blade segments 426 may be aligned to form a circumferential array of the aerofoils 410. Each blade segment 426 further includes a blade root 434. Each blade root 434 may extend radially inward from the corresponding platform portion 428.

The platform portions 428 together form the platform 402. The first edge 404 of the platform 402 may be formed together by first edge segments (not shown) of the blade segments 426. Similarly, the second edge 406 may be formed together by second edge segments (not shown) of the blade segments 426. The first longitudinal edge 430 of one blade segment 426 may be joined to the second longitudinal edge 432 of the adjacent blade segment 426 by various methods, for example, but not limited to, welding, brazing, mechanical fasteners, mechanical joints, or combinations thereof. Upon aligning and joining the adjacent blade segments 426, the first section 416A and the adjacent second section 416B together form the recess 416.

In the illustrated embodiment of FIGS. 5, 6 and 7, each blade segment 426 includes one aerofoil 410. However, in alternative embodiments, each blade segment 426 may include two or more aerofoils 410. In such cases, each blade segment 426 may define at least one full recess 416 and sections of at least two recesses 416. In some other embodiments, the platform 402 may be a single part component that defines all the recesses 416.

Each aerofoil 410 may be made of any suitable material such as a metal, a metal alloy, a ceramic, a composite, or combinations thereof. Each aerofoil 410 may include one or more channels for allowing flow of a cooling fluid.

The platform 402 may be made of any suitable material such as a metal, a metal alloy, a ceramic, a composite, or combinations thereof. The platform 402 may include one or more channels for allowing flow of a cooling fluid.

The recesses 416 described above may provide an easier escape path for purge air 212 to leak into the hot gas region 213 with minimal interaction with the respective leading edges 412. Maintaining a gap or distance between the flow of purge air 212 and the respective leading edges 412 may mitigate the formation of pressure side horseshoe vortices. Therefore, the recesses 416 may reduce secondary losses in a passage between respective adjacent aerofoils 410. Consequently, the recesses 416 may improve the efficiency of the aerofoil assembly 200. In some cases, the recesses 416 may improve a stage efficiency of a turbine by at least 0.1%, at least 0.2%, at least 0.5%, at least 1%, at least 2%, or at least 3%. The recesses 416 may also result in weight reduction of the aerofoil assembly 200.

Figure 8:
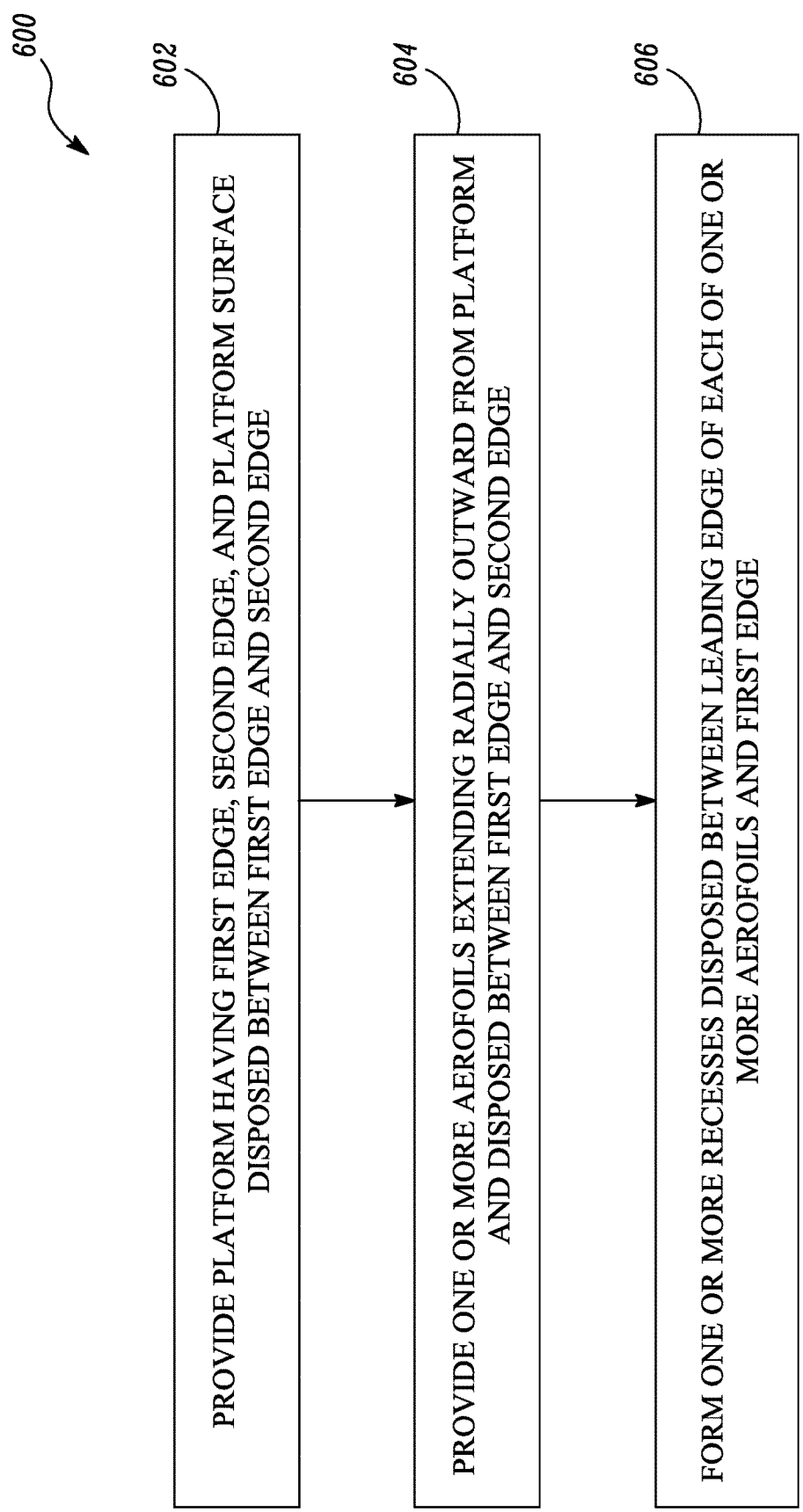
FIG. 8 is a flowchart of a method of reducing losses in an aerofoil assembly.

FIG. 8 illustrates a method 600 of reducing losses in an aerofoil assembly. The method 600 will be described with reference to the aerofoil assembly 200 described above with reference to FIGS. 4, 4A, 5, 6 and 7.

At step 602, the method 600 includes providing the platform 402 having the first edge 404, the second edge 406, and the platform surface 408 disposed between the first edge 404 and the second edge 406.

At step 604, the method 600 includes providing the one or more aerofoils 410 extending radially outward from the platform 402, and disposed between the first edge 404 and the second edge 406. Each of the one or more aerofoils 410 has the leading edge 412 proximal to the first edge 404 and the trailing edge 414 distal to the first edge 404. The pitch spacing "QD" is defined between the leading edges 412 of adjacent aerofoils 410 along the platform surface 408. The mid-pitch location "QL" is defined midway along the pitch spacing "QD".

At step 606, the method 600 further includes forming the one or more recesses 416. Each of the one or more recesses 416 is disposed between the leading edge 412 of each of the one or more aerofoils 410 and the first edge 404. Each recess 416 is disposed proximal to the mid-pitch location "QL" between adjacent aerofoils 410.

In some embodiments, each of the one or more recesses 416 is formed by removing material from the platform surface 408.

The material can be removed from the platform surface 408 by various material removal processes, for example, but not limited to, milling, drilling, grinding, electrical discharge machining, ultrasonic machining, abrasive jet machining, electron beam machining, or combinations thereof.

In some other embodiments, each of the one or more recesses 416 is formed by casting. In other words, each of the one or more recesses 416 is a cast-in feature.

In some embodiments, the minimum distance "E3" between the mid-pitch location "QL" and the recess 416 is between about 0% to about 70% of the distance "AL" between the first edge 404 and the leading edge 412 of each aerofoil 410.

In some embodiments, the minimum distance "E1" between the first edge 404 and the recess 416 is between about 0% to about 70% of the distance "AL" between the first edge 404 and the leading edge 412 of each aerofoil 410.

In some embodiments, the minimum distance "E4", "E5" between the recess 416 and the leading edge 412 of each of the adjacent aerofoils 404 is between about 10% to about 60% of the pitch spacing "QD" between the leading edges 412 of the adjacent aerofoils 404.

In some embodiments, the recess 416 extends from the first edge 404 of the platform 402 to the mid-pitch location "QL".

The method 600 may improve the stage efficiency of a turbine by mitigating the formation of pressure side horseshoe vortices. The method 600 may also result in weight reduction of the turbine.

It will be understood that the invention is not limited to the embodiments above-described and various modifications and improvements can be made without departing from the concepts described herein. Except where mutually exclusive, any of the features and the disclosure extends to and includes all combinations and sub-combinations of one or more features described herein.

We claim:

1. An aerofoil assembly comprising:
    a platform having a first edge, a second edge, and a platform surface disposed between the first edge and the second edge; and
    a plurality of aerofoils extending radially outward from the platform and disposed between the first edge and the second edge, each of the plurality of aerofoils having a leading edge proximal to the first edge and a trailing edge distal to the first edge, wherein:
        the platform defines one or more recesses axially rearward of the first edge, each of the one or more recesses including a recess boundary, each of the one or more recesses being disposed at a first distance between a first leading edge of a first aerofoil of the plurality of aerofoils and the boundary, and each of the one or more recesses is disposed at a second distance between a second leading edge of a second aerofoil of the plurality of aerofoils and the boundary,
        the first aerofoil and the second aerofoil are adjacent to each other, and
        the first distance and the second distance are in a range of 10%-60% of a distance between the first leading edge and the second leading edge.

2. The aerofoil assembly of claim 1, wherein a pitch spacing is defined between the leading edges of adjacent aerofoils along the platform surface, and wherein a mid-pitch location is defined midway along the pitch spacing.

3. The aerofoil assembly of claim 2, wherein each of the one or more recesses is disposed proximal to the mid-pitch location between adjacent aerofoils.

4. The aerofoil assembly of claim 3, wherein a minimum distance between the mid-pitch location and each of the one or more recesses is in a range of 0% to 70% of a distance between the first edge and the leading edge of each aerofoil.

5. The aerofoil assembly of claim 4, wherein a minimum distance between the first edge and each of the one or more recesses is in a range of 0% to 70% of the distance between the first edge and the leading edge of each aerofoil.

6. The aerofoil assembly of claim 3, wherein a mid-pitch region at least partly defined between adjacent aerofoils extends from the first edge to the second edge through the mid-pitch location, and each of the one or more recesses is disposed on the mid-pitch region.

7. The aerofoil assembly of claim 1, further comprising a plurality of blade segments disposed adjacent to each other, each blade segment comprising a corresponding aerofoil from the plurality of aerofoils and a platform portion that forms part of the platform.

8. The aerofoil assembly of claim 7, wherein each of the one or more recesses includes a plurality of recesses.

9. The aerofoil assembly of claim 8, wherein the platform portion of each blade segment defines a first section of a recess from the plurality of recesses and a second section of an adjacent recess, the first section of the platform portion of each blade segment and the second section of the platform portion of an adjacent blade segment together form the recess.

10. The aerofoil assembly of claim 9, wherein an area of the first section is greater than an area of the second section.

11. The aerofoil assembly of claim 9, wherein the platform portion of each blade segment includes a first longitudinal edge and a second longitudinal edge opposite to the first longitudinal edge, the first longitudinal edge of the platform portion of each blade segment being aligned with the second longitudinal edge of the platform portion of the adjacent blade segment, and the first section is disposed at the first longitudinal edge and the second section is disposed at the second longitudinal edge.

12. The aerofoil assembly of claim 1, wherein each of the one or more recesses has a maximum depth of between about 0.1% to about 6% of a maximum height of each of the plurality of aerofoils relative to the platform surface.

13. The aerofoil assembly of claim 1, wherein each of the one or more recesses includes a first lobe and a second lobe adjoining the first lobe.

14. A method of reducing losses in an aerofoil assembly, the method comprising:
    providing a platform having a first edge, a second edge, and a platform surface disposed between the first edge and the second edge;
    providing a plurality of aerofoils extending radially outward from the platform and disposed between the first edge and the second edge, each of the plurality of aerofoils having a leading edge proximal to the first edge and a trailing edge distal to the first edge; and
    removing material from the platform surface to form one or more recesses axially rearward of the first edge, each of the one or more recesses including a recess boundary, each of the one or more recesses being disposed at a first distance between a first leading edge of a first aerofoil of the plurality of aerofoils and the boundary, and each of the one or more recesses is disposed at a second distance between a second leading edge of a second aerofoil of the plurality of aerofoils and the boundary,
    the first aerofoil and the second aerofoil are adjacent to each other, and
    the first distance and the second distance are in a range of 10%-60% of a distance between the first leading edge and the second leading edge.

* * * * *